(12) United States Patent
Tan et al.

(10) Patent No.: US 7,005,550 B1
(45) Date of Patent: Feb. 28, 2006

(54) ARYLCARBONYLATED VAPOR-GROWN CARBON NANOFIBERS

(75) Inventors: Loon-Seng Tan, Centerville, OH (US); Jong-Beom Baek, Cheongju (KR)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/963,468

(22) Filed: Oct. 12, 2004

Related U.S. Application Data

(60) Provisional application No. 60/538,265, filed on Jan. 22, 2004.

(51) Int. Cl.
   *C07C 49/76*   (2006.01)
   *D01F 9/12*    (2006.01)
   *B32B 9/00*    (2006.01)
   *G01N 7/00*    (2006.01)

(52) U.S. Cl. .................. 568/335; 423/447.1; 428/367; 428/403; 73/31.05

(58) Field of Classification Search ................ 568/335; 423/447.1; 428/367, 403; 73/31.05
   See application file for complete search history.

(56) References Cited

U.S. PATENT DOCUMENTS

| | | | | |
|---|---|---|---|---|
| 5,849,215 A | * | 12/1998 | Gin et al. .............. | 252/299.01 |
| 6,645,455 B1 | * | 11/2003 | Margrave et al. ........ | 423/447.1 |
| 6,680,016 B1 | | 1/2004 | Wang et al. | |
| 6,710,366 B1 | * | 3/2004 | Lee et al. ...................... | 257/14 |
| 6,852,410 B1 | * | 2/2005 | Veedu et al. ................ | 428/367 |
| 6,890,654 B1 | * | 5/2005 | Stupp et al. ................ | 428/403 |

OTHER PUBLICATIONS

Smith Jr., J.G. et al, "Space Durable Polymer/Carbon Nanotube Films for Electrostatic Charge Mitigation", *Polymer*, 2004, pp. 825-836, vol. 45.
Kong, H. et al, "Controlled Functionalization of Multiwalled Carbon Nanotubes by In Situ Atom Transfer Radical Polymerization", *J. Am. Chem. Soc.*, 2004, pp. 412-413, vol. 126.
Baek, J.-B. et al, "Improved Syntheses of Poly(oxy-1,3-phenylenecarbonyl-1,4-phenylene) and Related Poly(etherketones) Using Polyphosphoric Acid/$P_2O_5$ as Polymerization Medium", *Polymer*, 2003, pp. 4135-4137, vol. 44.
Bahr, J.L. et al, "Covalent Chemistry of Single-Wall Carbon Nanotubes", *J. Mater. Chem.*, 2002, pp. 1952-2958, vol. 12.
Watson, K.A. et al., "Polyimide/Carbon Nanotube Composite Films for Potential Space Applications", *International SAMPE Technical Conference*, 2001, pp. 1551-1560, vol. 33.
Maruyama, B. et al, "Carbon Nanotubes and Nanofibers in Composite Materials", *SAMPE J.*, 2002, pp. 59-70, vol. 38.
Shaffer, M.S.P. et al, "Polystyrene Grafted Multi-Walled Carbon Nanotubes", *Chem. Commun.*, 2002, pp. 2074-2075.

(Continued)

*Primary Examiner*—Sikarl A. Witherspoon
(74) *Attorney, Agent, or Firm*—AFMCLO/JAZ; Charles E. Bricker

(57) ABSTRACT

Functionalized nanoscale carbon fibers and tubes of the formula:

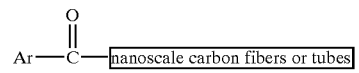

wherein Ar is selected from the group consisting of:

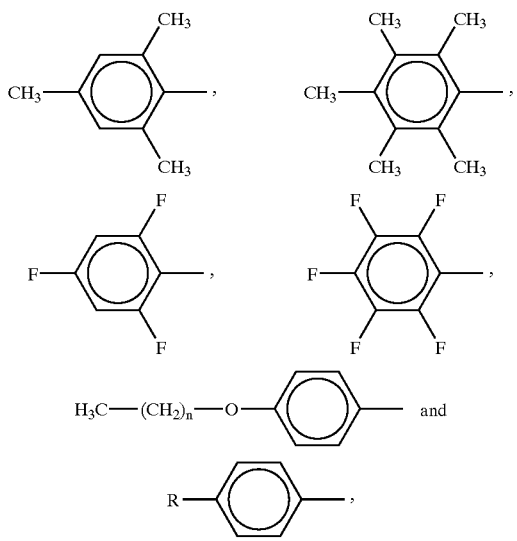

wherein R is selected from the group consisting of H, $H_3C—(CH_2)_n$— and

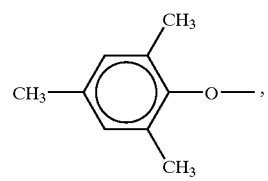

wherein n has a value of 0–10. Also provided is a process for functionalizing nanoscale carbon fibers or tubes.

2 Claims, No Drawings

OTHER PUBLICATIONS

Park, C. et al, "Dispersion of Single Wall Carbon Nanotubes by In-Situ Polymerization under Sonication", *Chem. Phys. Lett.,* 2002, pp. 303-308, vol. 364.

Tagmatarchis, N. et al, "Sidewall Functionalization of Single-Walled Carbon Nanotubes through Electrophilic Addition", *Chem. Commun.,* 2002, pp. 2010-2011, Cambridge.

* cited by examiner

ARYLCARBONYLATED VAPOR-GROWN CARBON NANOFIBERS

CROSS REFERENCE TO RELATED APPLICATION

This application claims priority of the filing date of Provisional Application Ser. No. 60/538,265, filed Jan. 22, 2004.

RIGHTS OF THE GOVERNMENT

The invention described herein may be manufactured and used by or for the Government of the United States for all governmental purposes without the payment of any royalty.

BACKGROUND OF THE INVENTION

The present invention relates to carbonyl-functionalized nanoscale carbon fibers and tubes and the method of preparation.

One-dimensional, carbon-based, nano-structured materials are generally divided into three categories based on their diameter dimensions: (i) single-wall carbon nanotubes or SWNT (0.7–3 nm); (ii) multi-wall carbon nanotubes or MWNT (2–20 nm); (iii) carbon nanofibers or CNF (40–100 nm). While the length of vapor grown carbon nanofiber (VGCNF) ranges 30–100 $\mu$m, it is difficult to determine the lengths of SWNT and MWNT because of their strong proclivity to aggregate (to form "ropes") but they are generally considered to be two-orders of magnitude shorter than CNF.

Because of the extraordinary thermal, mechanical, and electrical properties predicted for carbon nanotubes, they have had wide-spread attention in advanced materials research community in recent years. To take advantage of their predicted mechanical properties, several studies have been performed on CNT or VGCNF and reported their reinforcement in various thermoplastics and thermoset matrices. As an approach to achieving a good dispersion of single wall carbon nanotube (SWNT) in a high performance polymer, in-situ polymerization of polybenzoxazole (PBO) with SWNT in polyphosphoric acid (PPA) at 190° C. has been reported recently. Additionally, great strides have been achieved in the functionalization of SWNT to impart solubility and provide more processing options. Similar to the fullerene derivatiztion chemistry, the general nature of chemical reactions utilized in CNT functionalization to date are compatible with the electron-deficient character of the carbon nanotubes.

There is a combined need for both affordability and high performance in polymeric materials.

Accordingly, it is an object of the present invention to provide uniquely functionalized nanoscale carbon fibers and tubes with desirable properties.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention, there are provided functionalized nanoscale carbon fibers and tubes of the formula:

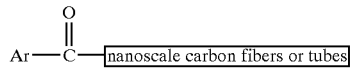

wherein Ar is selected from the group consisting of:

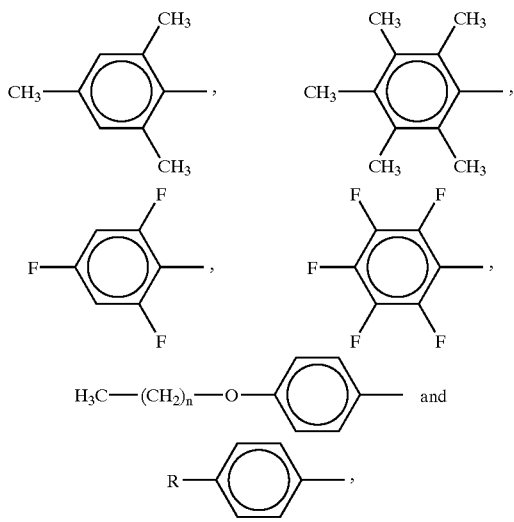

wherein R is selected from the group consisting of H, $H_3C—(CH_2)_n—$ and

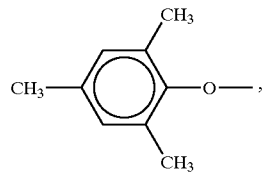

wherein n has a value of 0–10.

DETAILED DESCRIPTION OF THE INVENTION

The functionalized carbon fibers or tubes are prepared in polyphosphoric acid (PPA) at a temperature of about 130° C. An acid Ar—COOH, wherein Ar is as defined above, nanoscale carbon fibers or tubes, and PPA (83% assay) are combined and stirred with dried nitrogen purging at about 130° C. for about 3 hours. Additional $P_2O_5$ is then added in one portion; and heating is continued, with stirring for about 24–60 hours. The reaction product is then precipitated from the PPA reaction solution with water or other product nonsolvent.

Suitable aromatic acids useful in this reaction include 2,4,6-trimethylbenzoic acid (mesitylenecarboxylic acid), 1,2,3,4,5-pentamethylbenzoic acid, 2,4,6-trifluorobenzoic acid, 1,2,3,4,5-pentafluorobenzoic acid, 4-alkoxybenzoic acids, benzoic acid, 4-alkylbenzoic acid and 2,4,6-trimethylphenoxybenzoic acid.

Functionalization of the nanoscale carbon fibers and tubes is conducted in polyphosphoric acid (PPA). Preliminarily, it is helpful to describe the chemistry of phosphoric acids and strong phosphoric acids or polyphosphoric acids as follows: As used herein the term "phosphoric acid(s)" means commercial phosphoric acid(s) containing 85–86% $H_3PO_4$. The strong phosphoric acids, or polyphosphoric acids referred to as PPA (polyphosphoric acid) are members of a continuous series of amorphous condensed phosphoric acid mixtures given by the formula $H_{n+2}P_nO_{3n+1}$ or $HO-PO_3H_nH$ where the value of n depends on the molar ratio of water to phosphorus pentoxide present.

In its most general definition, polyphosphoric acid composition can range from distributions where the average value of n is less than unity, giving rise to a mobile liquid, to high values of n, where the polyphosphoric acid is a glass at normal temperatures. Because the species of polyphosphoric acid are in a mobile equilibrium, a given equilibrium composition can be prepared in many ways. For instance, the same distribution or polyphosphoric acid composition could be prepared by either starting with concentrated orthophosphoric acid ($H_3PO_4$, n=1) and driving off water or by starting with phosphorus pentoxide ($P_2O_5$) and adding an appropriate amount of water.

All polyphosphoric acid compositions can be described as a ratio of $P_2O_5$ and water by reducing the various species present (on paper) to $P_2O_5$ and water. We will then use the convention that polyphosphoric acid composition will be expressed in terms of a $P_2O_5$ content (as a percentage) defined as $P_2O_5$ content =(weight of $P_2O_5$)/(weight of $P_2O_5$+weight of water) ×100.

Thus, the $P_2O_5$ content of pure orthophosphoric acid could be derived by reducing one mole of $H_3PO_4$ to 0.5 moles $P_2O_5$+1.5 moles $H_2O$. Converting to weights gives the $P_2O_5$ content as (0.5*142)/((0.5*142)+(1.5*18.01))=72.4%

Similarly, the $P_2O_5$ content of commercial polyphosphoric acid can be derived in the following way. Polyphosphoric acid is available commercially in two grades, 105% and 115%. These percentages refer to $H_3PO_4$ content, which means that 100 g of the two grades contain 105 and 115 grams of $H_3PO_4$. The $P_2O_5$ content of 115% polyphosphoric acid can then be calculated knowing the $P_2O_5$ content of 100% $H_3PO_4$:

(115*0.724)/100=83.3%

Functionalization of nanoscale carbon fibers or tubes in accordance with this invention increases the dispersibility of such carbon fibers or tubes in polymeric materials.

The following examples illustrate the invention:

EXAMPLE 1

4-(2,4,6-Trimethylphenoxy)benzonitrile

Into a 250 mL three-necked, round-bottomed flask equipped with a magnetic stir-bar, nitrogen inlet, and a condenser, 2,4,6-trimethylphenol (6.00 g, 44.1 mmol), 4-fluorobenzonitrile (5.34 g, 44.1 mmol), potassium carbonate (7.30 g, 52.8 mmol), and a mixture of NMP (100 mL) and toluene (60 mL) were placed. The reaction mixture was then heated and maintained around 140° C. for 8 hours with vigorous nitrogen flow. The dark solution was filtered while it was warm and the filtrate was poured into distilled water containing 5% hydrochloric acid. The solution was separated into organic layer and aqueous layer. The organic layer was diluted with dichloromethane and separated. The solvent was removed completely from the organic extract. Light brown oily residue was freeze-dried to afford 10.1 g (97% yield) of the desired product. Anal. Calcd. for $C_{16}H_{15}NO$: C, 80.98%; H, 6.37%; N, 5.90%; O, 6.74%. Found: C, 80.31%; H, 6.37%; N, 5.75%; O, 6.46%. FT-IR (KBr, cm$^{-1}$): 2226 (C≡N stretch). Mass spectrum (m/e): 237 (M$^+$, 100% relative abundance), 222, 204, 194. $^1$H NMR (CDCl$_3$, ppm) δ 2.05 (s, 6H, CH$_3$), 2.30 (s, 3H, CH$_3$), 6.81–6.84 (d, 2H, Ar), 6.91 (s, 2H, Ar), 7.53–7.56 (d, 2H, Ar). $^{13}$C NMR (CDCl$_3$, ppm) δ 16.10, 20.79, 115.48, 129.07, 129.15, 129.88, 130.48, 134.25, 147.84, 150.03, 161.44.

EXAMPLE 2

4-(2,4,6-Trimethylphenoxy)benzoic acid

Into a 250 mL three-necked round-bottomed flask equipped with a magnetic stir-bar, nitrogen inlet, and a condenser, 4-(2,4,6-trimethylphenoxy)benzonitrile (10.0 g, 42.0 mmol) and phosphoric acid (100 mL) were placed. The reaction mixture was then heated and maintained around 150° C. for 8 hours. After cooling down to room temperature, the mixture was poured into distilled water containing 5% hydrochloric acid. The resulting precipitates were collected by suction filtration, air-dried, dissolved in warm heptane, and filtered. The filtrate was allowed to cool to room temperature to afford 4.5 g (42% yield) of white crystal: mp 236–238° C. Anal. Calcd. for $C_{16}H_{16}O_3$: C, 74.98%; H, 6.29%; O, 18.73%. Found: C, 74.76%; H, 6.67%; O, 18.56%. FT-IR (KBr, cm$^{-1}$): 1650 (C=O stretch), 3385 (O—H stretch). Mass spectrum (m/e): 256 (M$^+$, 100% relative abundance), 255. $^1$H NMR (DMSO-d$_6$, ppm) δ 2.00 (s, 6H, CH$_3$), 2.67 (s, 3H, CH$_3$), 6.74–6.77 (d, 2H, Ar), 6.98 (s, 2H, Ar), 7.82–7.86 (d, 2H, Ar). $^{13}$C NMR (DMSO-d$_6$, ppm) δ 15.80, 20.41, 113.80, 127.65, 129.69, 129.81, 130.12, 134.47, 147.95, 159.95, 167.06.

EXAMPLE 3

Functionalization of VGCNF with 4-(2,4,6-trimethylphenoxy)benzoic acid

The VGCNF were obtained from Applied Sciences Inc., Cederville, Ohio. The diameters and lengths of these VGCNF (Pyrograph III-19-HT™) ranges from 100–200 nm and 30–100 μm, respectively. These VGCNF were heated treated up to 3,000° C. to graphitize the surface carbon and remove residual iron catalyst and to improve the associated conducting properties. Since these vapor-grown carbon nanofibers (as opposed to carbon nanofibers from electro-spinning process) have hollow cores and a "stacked Dixie cups" morphology, they can be considered as multi-wall carbon nanotubes (MWNT).

Into a 250 mL resin flask equipped with a high torque mechanical stirrer, and nitrogen inlet and outlet, 4-(2,4,6-trimethylphenoxy)benzoic acid-(0.50 g, 1.95 mmol), and VGCNF (0.50 g), and PPA (83% assay, 20 g) was placed and stirred with dried nitrogen purging at 130° C. for 3 h. $P_2O_5$ (5.0 g) was then added in one portion. The initially dark mixture became deep brown after 24 hours. The temperature was maintained 130° C. for 80 hours. After cooling down to room temperature, water was added. The resulting precipitates were collected, washed with diluted ammonium hydroxide and Soxhlet extracted with water for three days and methanol for three days, and finally dried over phosphorous pentoxide under reduced pressure (0.05 mmHg) at 100° C. for 72 h to give 0.82 g (85% yield) of dark brown solid: Anal. Calcd. for $C_{21.58}H_{0.63}O_{1.43}$: C, 92.63%; H, 2.36%; 0, 5.00%. Found: C, 90.93%; H, 2.82%; O, 4.89%. [Calcd for VGCNF ($C_\infty$): C, 100.00%; H, 0.00%; O, 0.00%. Found: C, 98.67%; H, 1.10%; O, <0.20% (less than detection limit)]. FT-IR (KBr, cm$^{-1}$): 1240, 1590, 1646, 2922, 3434.

Having thus described exemplary embodiments of the present invention, it should be noted by those skilled in the art that the disclosures herein are exemplary only and that alternatives, adaptations and modifications may be made within the scope of the present invention.

We claim:

1. Functionalized nanoscale carbon fibers and tubes of the formula:

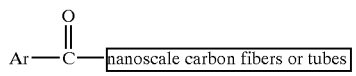

wherein Ar is selected from the group consisting of:

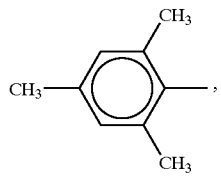 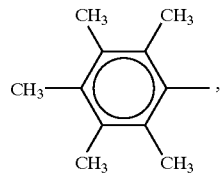

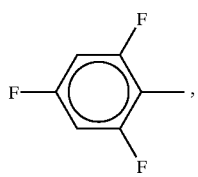 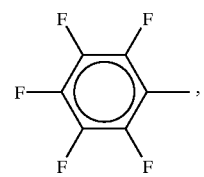

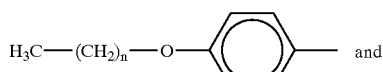

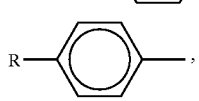

wherein R is selected from the group consisting of H, $H_3C—(CH_2)_n$— and

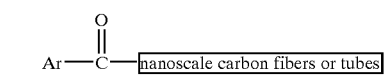

wherein n has a value of 0–10.

2. A process for preparing functionalized nanoscale carbon fibers and tubes of the formula:

wherein Ar is selected from the group consisting of:

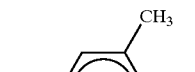 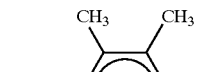

 

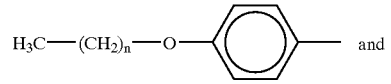

wherein R is selected from the group consisting of H, $H_3C—(CH_2)_n$— and

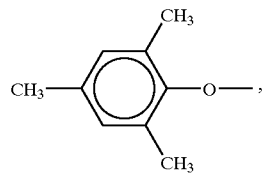

wherein n has a value of 0–10, which comprises the steps of (a) combining an acid Ar—COOH, wherein Ar is as defined above, nanoscale carbon fibers or tubes, and 83% PPA, (b) stirring this mixture at about 130° C. for about 3 hours, (c) adding additional $P_2O_5$, (d) continuing to heat the mixture with stirring for about 24–60 and (e) recovering the reaction product.

* * * * *